Dec. 23, 1958 E. W. GOLDBERG 2,865,248
COMBINATION SLIDE AND FILM PROJECTOR WITH AUTO-FOCUSING
Filed March 3, 1952 3 Sheets-Sheet 1
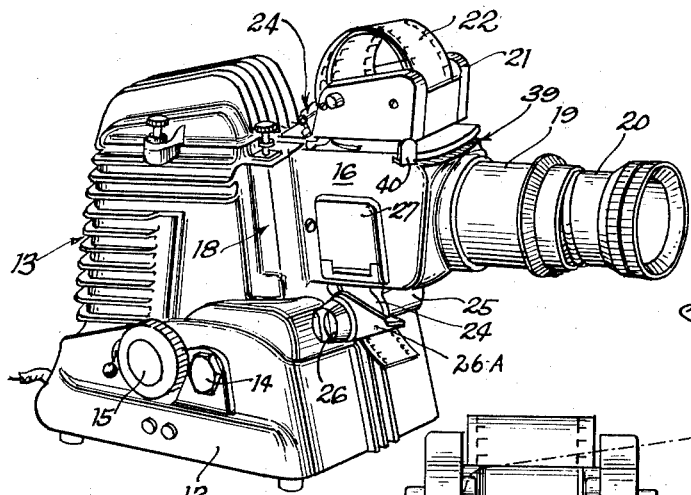
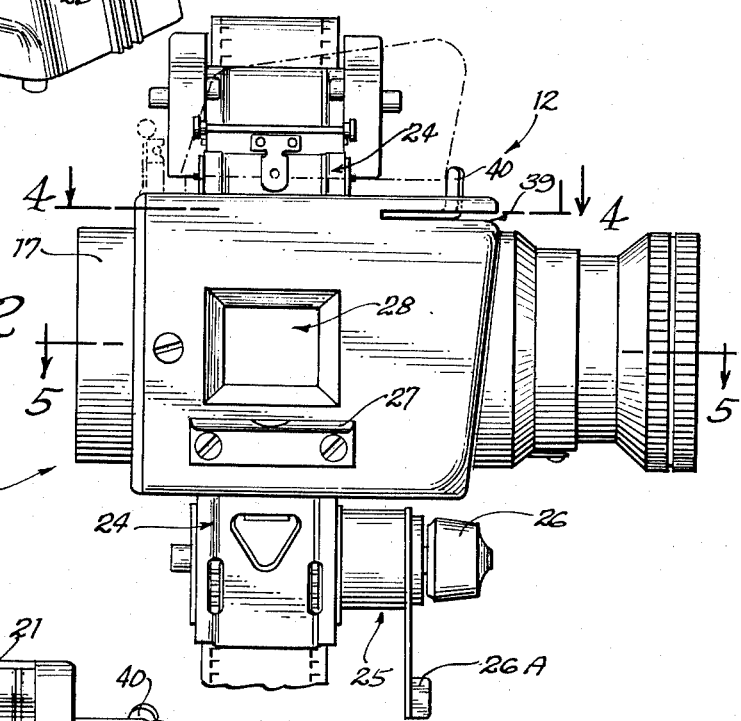
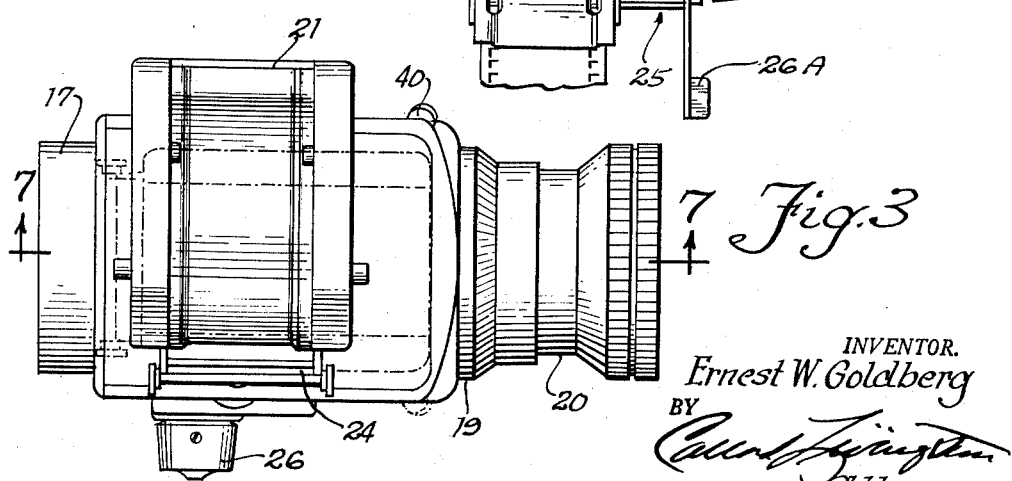
INVENTOR.
Ernest W. Goldberg
BY
Attorney

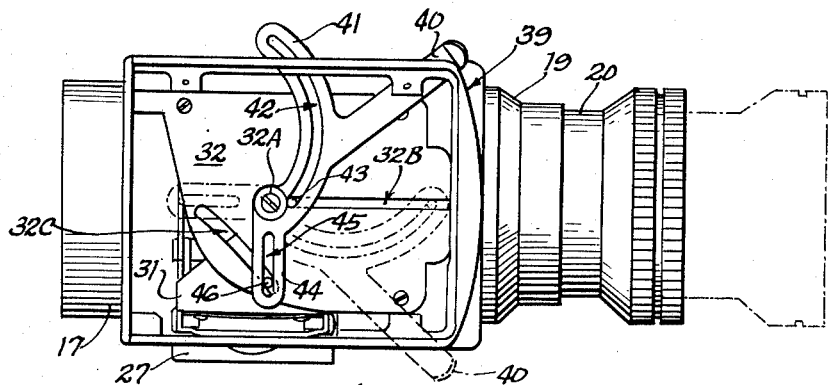
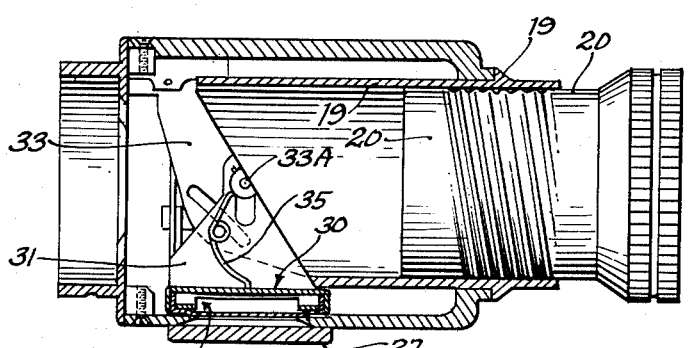
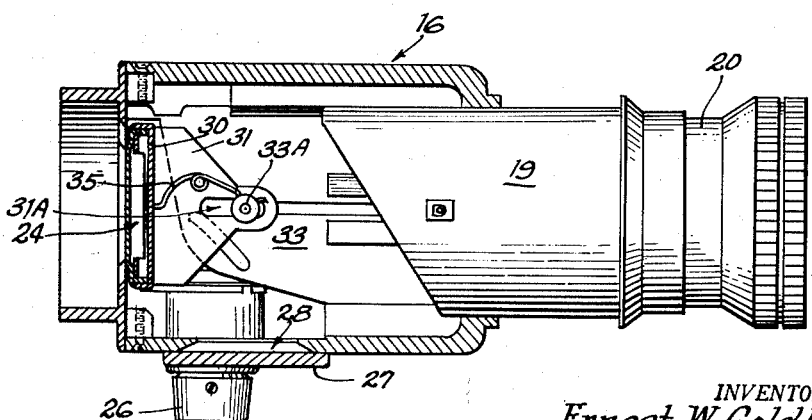

Dec. 23, 1958  E. W. GOLDBERG  2,865,248
COMBINATION SLIDE AND FILM PROJECTOR WITH AUTO-FOCUSING
Filed March 3, 1952  3 Sheets-Sheet 3

INVENTOR.
Ernest W. Goldberg
BY
Attorney

United States Patent Office 2,865,248
Patented Dec. 23, 1958

2,865,248

COMBINATION SLIDE AND FILM PROJECTOR WITH AUTO-FOCUSING

Ernest W. Goldberg, Wilmette, Ill., assignor, by mesne assignments, to Minneapolis-Honeywell Regulator Company, a corporation of Delaware Application March 3, 1952, Serial No. 274,534

9 Claims. (Cl. 88—28)

This disclosure pertains generally to projectors for films, slides and like transparencies, and more particularly to a type of projector which is capable of shifting quickly from film to slide-projecting conditions by reason of having a swinging film carrier or turret as part of a swing-away head structure such as disclosed in my co-pending application Serial No. 208,401, filed January 29, 1951, for a "Slide and Film Projector with Swing-Away Head," now Patent No. 2,783,680, issued March 5, 1957.

The principal object of the present invention is the provision of auto-focusing means coacting with a film turret in a swing-away head structure, such as disclosed and claimed in my aforesaid copending application.

A further object is the provision of an auto-focusing mechanism and lens mount cooperable with a swing-away film turret to shift the lens to predetermined positions of focus simultaneously with movement of the film turret so that the lens will always be in focus with the focal plane of the slide bed or the film bed, whichever is to be used.

A further object is the provision of a simple actuating leverage for simultaneously effecting linear movement of a lens barrel, and a compound linear and arcuate movement of the film turret.

Additional objects and aspects of novelty and utility peculiar to the device relate to details of construction and operation of the embodiment described hereinafter in view of the annexed drawings, in which:

Fig. 1 is a perspective view of a combination slide and film projector embodying the invention;

Fig. 2 is a side elevation of the swing-away head to enlarged scale;

Fig. 3 is a top plan view of the head of Fig. 2;

Fig. 4 is a horizontal sectional detail taken near the top of the head along lines 4—4 of Fig. 2, and showing the auto-focusing and turret-shifting leverage in plan;

Fig. 5 is another horizontal sectional detail taken along lines 5—5 of Fig. 2 near the middle of the head and showing in plan portions of the turret mounting near the bottom of the head, as well as portions of the lens barrel bedding;

Fig. 6 is another horizontal sectional detail similar to Fig. 5 but showing the turret and lens in film-projecting position;

Figure 7:
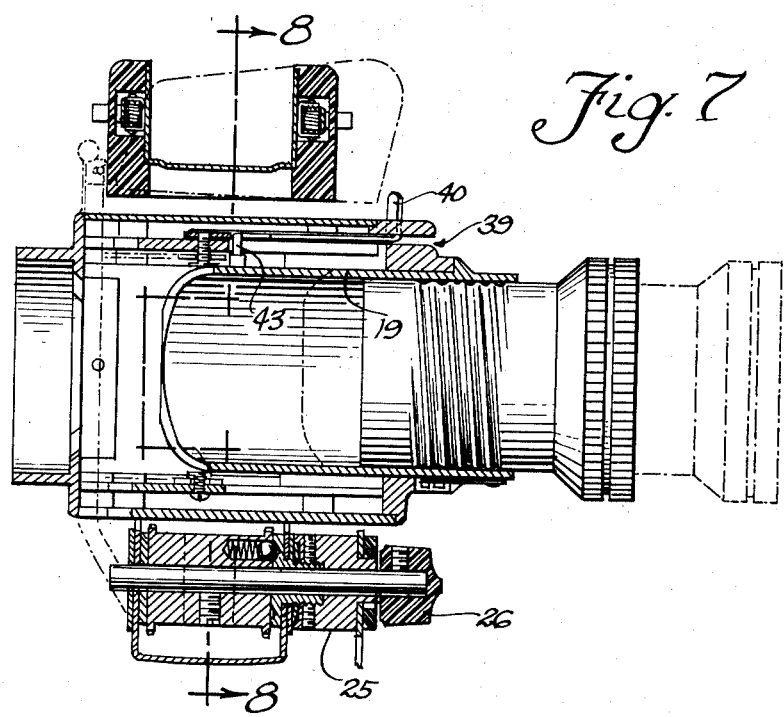
Fig. 7 is a vertical sectional detail through the head, as viewed along lines 7—7 of Fig. 3.

Referring to Fig. 1, the projector there shown consists of a base 12 in which is pivotally mounted a lamp housing 13 to rock on pivots 14, as by adjustment of a tilting control knob 15.

The head structure 16 has a mounting flange 17 (Fig. 2) which fits into a socket in the front of the lamp housing and a slide bed 18 (Fig. 1) cast as a part thereof.

At the forward side of the head is a main telescoping lens barrel 19 in which is a secondary telescoping and/or threaded lens barrel 20.

Figure 8:
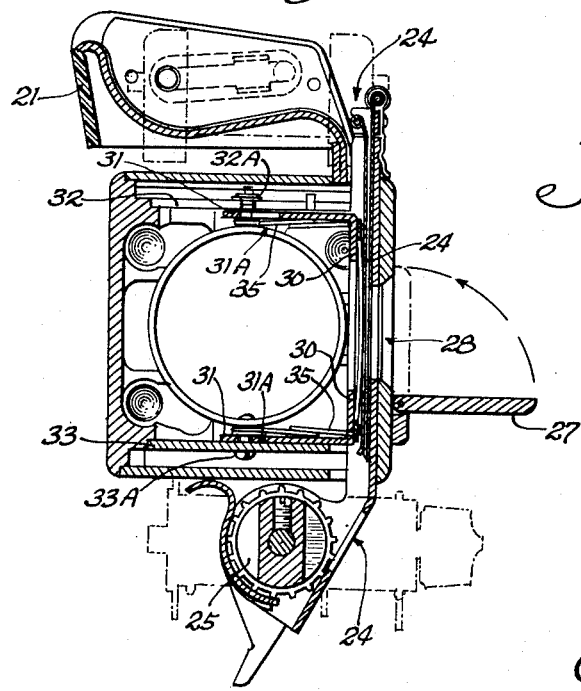
Fig. 8 is a vertical sectional detail taken along lines 8—8 of Fig. 7.

At the top of the head, as part of the film turret, is a film bed 21 adapted to receive a roll of strip film 22, which is threaded down into a film track generally indicated at 24 in Figs. 1, 2, and 8. This film track is rigidly attached to the film bed, and at its lower end, beneath the head, is equipped with a sprocket film feed 25, including a feeding knob 26.

The details of the film track and sprocket feed are fully described in my aforesaid copending application and are not further described in detail herein, since the construction and operation thereof does not of itself form part of the present invention, it being of significance mainly that the film bed 21, track 24, and feed 25 are a unit and swing into and out of alignment with the projection axis cooperatively with the focusing means, as will hereinafter appear in detail.

Referring to Fig. 8, the pivotal mounting for the film turret consists of a bracket 30 attached to the film track and having upper and lower horizontally-extensive wings 31 (see also Fig. 5 in which only the lower wing is seen).

Seated on ledges in the head are upper and lower bed plates 32 and 33 (Fig. 8), and in each of these, respectively, is an upper and lower pivot bolt 32A and 33A respectively engaging the upper and lower horizontal turret-mounting bracket wings 31, so that the turret, inclusive of the bed 21, film track 24, and sprocket feed 25—26, will be seen to pivot about a vertical axis through the two bolts 32A, 33A.

The foregoing constructions are also seen to advantage in Figs. 4, 5, and 6. The upper bed plate 32 is seen in Fig. 4, along with the upper bracket wing 31 and its pivot bolt 32A; while in Figs. 5 and 6 the lower wing 31, bed plate 33, and pivot bolt 33A are seen.

Both the upper and lower bracket wings are provided with elongated slots 31A (as in Fig. 6) through which the respective pivot bolts pass, so that the turret is thus capable of both pivotal and linear shifting; and springs 35, top and bottom, urge the turret, and particularly the film track 24, linearly back toward the lamp housing to keep the track in the focal plane when the same is pivoted into film-projecting position, as in Fig. 6.

Because of the square configuration and confining dimensions of the film head casting, the turning radius for the film track must be shortened in pivoting the film track from the projecting position of Fig. 6 to the framing position of Fig. 5, and wing slots 31A permit such action.

Means for pivoting the film turret is shown especially in Fig. 4 and includes a peculiarly shaped lever having a handle projection 40 extending outwardly of the head through an arcuate slot 39 (Figs. 1 and 2) therein; and an arcuate branch 41 having a cam slot 42 therein into which projects a pin 43 on the main lens barrel 19 (see Fig. 7). Finally, the focusing lever has a short arm 44 provided with a linear slot 45 into which projects a pin 46 fixed on the upper bracket wing 31 and projecting through a small arcuate slot 32C in the upper bed plate, the latter having also a long linear slot 32B in which the lens barrel pin 43 works.

It will now be apparent that, if the focusing and turret lever means 40 is moved from the full-line to the dotted-line position of Fig. 4, the short arm 44, working against pin 46, will pivot the film turret structure (about bolts 32A—33A) from the positions of Figs. 4 and 5 into the position of Fig. 6; and simultaneously, the long arcuate arm 41, working against lens pin 43, will shift the main lens barrel 19 into position of Fig. 6.

Thus, having set the projector up to project slides, for example, the secondary or auxiliary lens barrel 20 would be moved in or out of the main barrel to procure proper focus on the screen, so that thereafter a change of focus, as by manipulation of lever 40, would merely move the main barrel 19, and the focus for the screen would remain undisturbed, but the proper focus for the focal plane would be changed.

In this manner the main lens barrel is automatically positioned for a focal plane in the slide bed 18 (Fig. 1) or for positioning of the film track in the optical axis, as in Fig. 6.

When the film track is in the framing or non-projecting position of Figs. 2, 5, and 8, the film in the turret track will be disposed opposite a framing window 28 in the side of the head (Fig. 2), and by opening the framing door 27 (shown closed in Fig. 1, and open in Fig. 2), the view or frame on the film may be adjusted so that it is properly centered or "framed" by manipulating the framing lever 26A (Fig. 2), which operates the film sprockets independently of the feed knob 26 in a known manner having no bearings on the present disclosures.

The swing-away film head 16 is applicable as an auxiliary or replacement unit for standard lens units in the type of projector shown in Fig. 1, and the head is thus itself a separate article of commerce or part of the original equipment to be included with such a projector.

The slide bed 18 of the projector is commodiously dimensioned and purposely situated to accommodate various types of automatic slide changing mechanism (not shown) of which there are several types available on the market, such devices being somewhat heavy and large and requiring for most satisfactory operation a firm bedding, so that the location of the slide bed 18 is desirably positioned to lie as nearly above the pivotal axis of the projector housing, through pivot or trunnion bolts 14, as possible; and this necessarily removes the focal plane of the slide bed away from the focal plane of the film track by such an amount that each change from slide projection to film projection necessitates a considerable readjustment of the focus of the projection lens whenever such changes are made.

The present autofocusing and turret-pivoting mechanism effects the necessary changes accurately, conveniently, and rapidly.

I claim:

1. In a picture projector having a slide bed in one focal plane and a film track movable into and out of a different focal plane, and a projecting lens device movable into focus with either said plane, the combination of mechanism drivingly interconnecting said track and lens device for moving said film track into a position of focus and simultaneously moving said lens device into focus with the track, and moving said film track out of its focal plane and simultaneously moving the lens device into focus with said slide bed.

2. In a picture projector, the combination with a slide bed located in one focal plane, a movable film track located in another plane, and movable projecting lens means selectively adjustable for focus with either said track or bed, of mechanism including a driving linkage between said track and lens means for moving said track into and out of its focal plane to one side of the projection axis and simultaneously moving said lens device into focus with the film track when the latter is in its focal plane, and into focus with the slide bed when the film track is out of its focal plane as aforesaid.

3. In a picture projector, the combination with a slide bed in a first focal plane at one position along the optical axis, a movable film carrier mounted to pivot into and out of a second focal plane at another position along said axis, lens means including a lens carrier mounted for movement to bring the lens means into focus with either focal plane, and mechanism transmitting a linear shifting force to said lens carrier responsive to pivotal movement of the film carrier and operable to move the film carrier and lens carrier together to focus the lens means with the first focal plane when the film carrier is out of the second focal plane, and to move the lens carrier and position the lens means in focus with the second plane when the film carrier is moved into position in the second focal plane.

4. In a slide and film projector having a slide bed at a first focal position, an auto-focusing film head comprising a head body fitted onto the projector in advance of said slide bed, a lens carrying barrel movable back and forth in said head, a film holder pivoted in said head for movement from a non-projection position at one side of the optical axis to a position to dispose a film therein in a projection position in a second focal position in said axis in advance of said first focal position, and a control lever pivoted in said head and having driving connection with said film holder and said lens barrel to move the same cooperatively and pivot the holder into and out of said non-projection and projection positions, and dispose the lens barrel in a condition to focus the lens carried thereby with the first focal position when the film holder is in non-projection position, and with the second focal position when the film holder is in projection position.

5. In a projector, a slide bed located in a first focal plane, a film holder pivoted to swing into and out of a second focal plane across the same optical axis as that of the first plane, a projection lens and means movably mounting the same in optical alignment with said axis for focal adjustment with either of said planes, and mechanism including coacting lever and camming means for pivoting said film holder into and out of said second focal plane and moving said lens mounting means into focus with said second focal plane when the film holder is disposed therein, and into focus with said first focal plane when said film holder is disposed out of the second focal plane.

6. In a projector for both slides and films: auto-focusing means comprising a slide holder in a first focal plane; a film holder and means mounting the same for movement into and out of a second focal plane on the same optical axis as the first focal plane; lens means to be focused upon both focal planes; holding means for said lens means and mounted for linear focusing adjustment relative to both of said focal planes back and forth along said optical axis, mechanism for adjustably moving said lens holding means into focus with either of said focal planes; and further mechanism having driving connection with said first-mentioned mechanism and said film holder for concurrently moving the latter into said second focal plane with movement by said first mechanism of said holding means to position said lens means in focus with said second focal plane; said mechanisms cooperating to move the film holder to an idle position out of said second focal plane to a position at one side of said axis responsive to movement of said lens holding means by the first mechanism in positioning the lens means in focus with said first focal plane.

7. Auto-focusing means as set forth in claim 6 and further characterized in that said film holder, said lens holder and mounting means therefor, and said mechanisms for moving the lens and film holders, are carried in cooperative assembly by a housing removably attached to said projector, and having light-projection openings therethrough in register with said optical axis.

8. Apparatus according to claim 7 and further characterized by the provision of a manually operable focusing lever operatively linked in said housing to said first mechanism, at least, for focusing actuation of the latter, said lever including a portion projecting exteriorly of the housing for operative manipulation.

9. Apparatus according to claim 6 and further characterized by the provision of a sidewall in said housing at one side of said optical axis and having a framing window formed therein in confronting juxtaposition with the focal plane of said film holder, when the latter is disposed in said idle position, for inspection of film carried in the holder and film-transport mechanism having support on said housing for moving a film through the focal plane of said film holder in any position thereof.

References Cited in the file of this patent

UNITED STATES PATENTS

| | | |
|---|---|---|
| 632,472 | Roebuck et al. | Sept. 5, 1899 |
| 1,927,222 | Shannon | Sept. 19, 1933 |
| 1,945,863 | Mitchell | Feb. 6, 1934 |
| 2,231,743 | Young et al. | Feb. 11, 1941 |
| 2,243,160 | Koehl | May 27, 1941 |
| 2,251,077 | Stanton | July 29, 1941 |
| 2,285,915 | Dutton | June 9, 1942 |
| 2,457,914 | Nemeth | Jan. 4, 1949 |
| 2,534,732 | Perillo | Dec. 19, 1950 |
| 2,553,075 | Bradford | May 15, 1951 |

FOREIGN PATENTS

| | | |
|---|---|---|
| 695,654 | Germany | Aug. 30, 1940 |